(12) United States Patent
Saxena et al.

(10) Patent No.: US 10,062,130 B2
(45) Date of Patent: Aug. 28, 2018

(54) GENERATING AUTHENTICATED INSTRUMENTS FOR ORAL AGREEMENTS

(71) Applicant: ADOBE SYSTEMS INCORPORATED, San Jose, CA (US)

(72) Inventors: Neha Saxena, San Jose, CA (US); Divij Kumar, San Jose, CA (US); Aditya Kumar Pandey, Noida (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 151 days.

(21) Appl. No.: 14/939,573

(22) Filed: Nov. 12, 2015

(65) Prior Publication Data

US 2017/0140486 A1 May 18, 2017

(51) Int. Cl.
*G06F 7/04* (2006.01)
*G06Q 50/18* (2012.01)
*G06Q 10/10* (2012.01)
*G06F 17/30* (2006.01)

(52) U.S. Cl.
CPC ........... *G06Q 50/188* (2013.01); *G06Q 10/10* (2013.01)

(58) Field of Classification Search
CPC .. G06F 17/2288; G06F 17/241; G06F 17/289; G06F 21/10; G06F 21/32; G06F 17/243; G06F 3/167; G06F 17/2247; G06F 19/322; G06F 19/325; G06F 19/363; G06F 21/64; H04L 9/3247; H04L 63/123
USPC ............................................ 704/206; 726/26
See application file for complete search history.

(56) References Cited

U.S. PATENT DOCUMENTS

| | | | |
|---|---|---|---|
| 2002/0094065 A1* | 7/2002 | Squibbs | H04M 3/42221 379/67.1 |
| 2004/0139344 A1* | 7/2004 | Maurer | H04L 9/3247 726/26 |
| 2009/0177517 A1* | 7/2009 | Nichols | G06Q 10/06 705/7.12 |
| 2010/0161993 A1* | 6/2010 | Mayer | G06F 21/64 713/178 |
| 2010/0313028 A1* | 12/2010 | Li | G06F 21/34 713/173 |
| 2010/0313032 A1* | 12/2010 | Oswalt | H04L 63/123 713/176 |
| 2011/0287748 A1* | 11/2011 | Angel | H04M 3/42221 455/414.1 |
| 2012/0303962 A1* | 11/2012 | Ghani | G06F 17/243 713/176 |

(Continued)

*Primary Examiner* — Gary S Gracia
(74) *Attorney, Agent, or Firm* — Shook, Hardy & Bacon L.L.P.

(57) ABSTRACT

In various implementations, a digital media recording is received from a user for conversion into an authenticated instrument of an oral agreement. The digital media recording is embedded into an electronic agreement document that is configured to represent an instrument of the oral contract terms between two or more contracting parties. The digital media recording forms a content portion of the electronic agreement document, which is reviewed by each of the contracting parties. A playback status associated with the content portion is monitored to determine that each of the contracting parties have substantially reviewed the terms of the agreement. Upon determining that the content portion has been substantially reviewed by all parties, the contracting parties are requested to electronically sign the electronic agreement document.

19 Claims, 7 Drawing Sheets

(56) References Cited

U.S. PATENT DOCUMENTS

| | | | | |
|---|---|---|---|---|
| 2012/0323796 | A1* | 12/2012 | Udani | G06Q 50/24 |
| | | | | 705/80 |
| 2013/0145016 | A1* | 6/2013 | Vantalon | H04N 21/2541 |
| | | | | 709/224 |
| 2014/0003675 | A1* | 1/2014 | Li | G06F 21/32 |
| | | | | 382/123 |
| 2014/0050307 | A1* | 2/2014 | Yuzefovich | H04M 15/41 |
| | | | | 379/68 |
| 2014/0095637 | A1* | 4/2014 | Cropper | H04L 67/22 |
| | | | | 709/206 |
| 2015/0127348 | A1* | 5/2015 | Follis | H04L 9/3247 |
| | | | | 704/260 |
| 2015/0150141 | A1* | 5/2015 | Szymanski | G06Q 30/0635 |
| | | | | 726/26 |
| 2015/0188711 | A1* | 7/2015 | Kirgan | H04L 9/3247 |
| | | | | 713/176 |
| 2015/0317635 | A1* | 11/2015 | Karamchedu | G06Q 20/4014 |
| | | | | 705/44 |

* cited by examiner

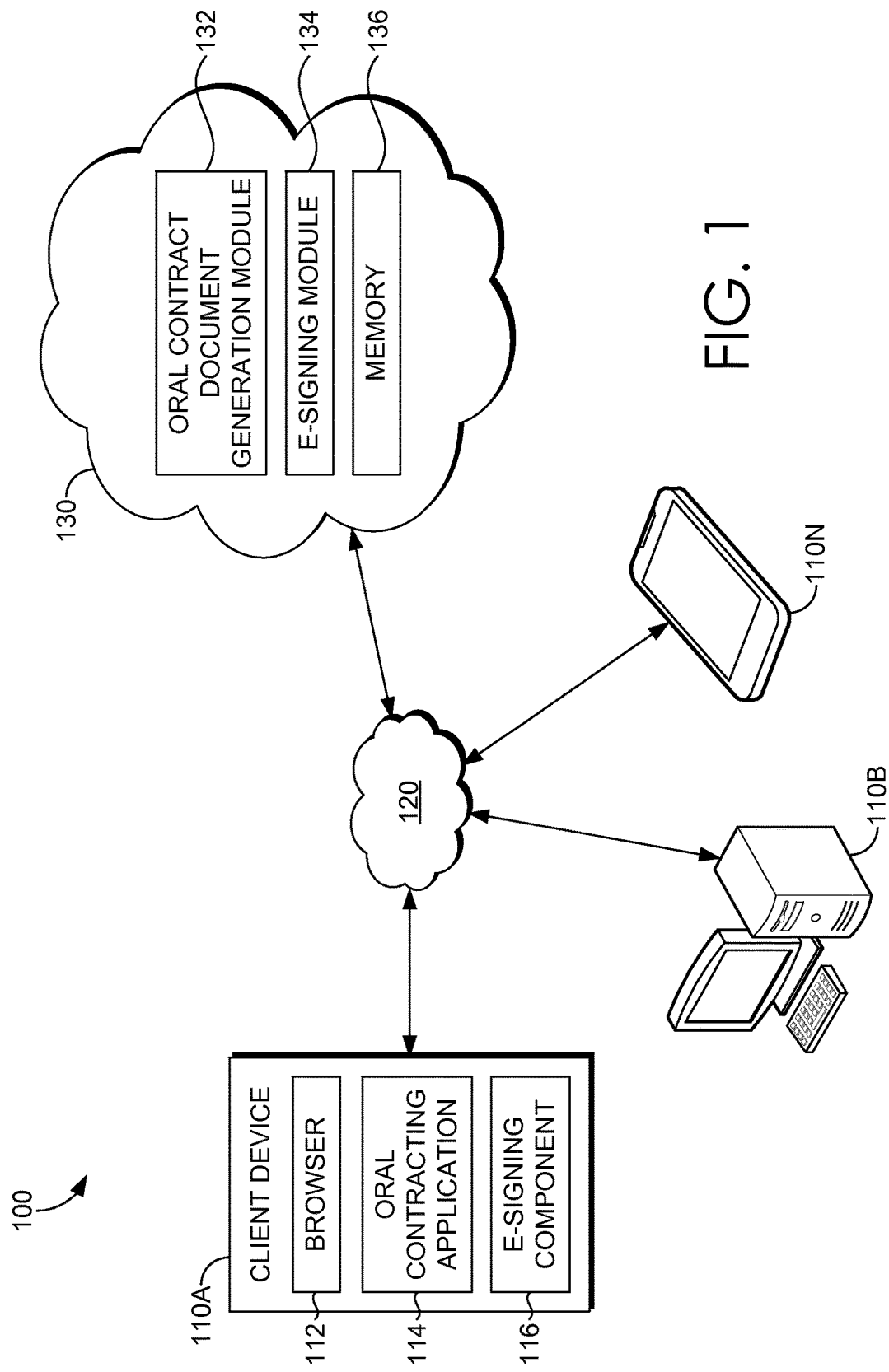

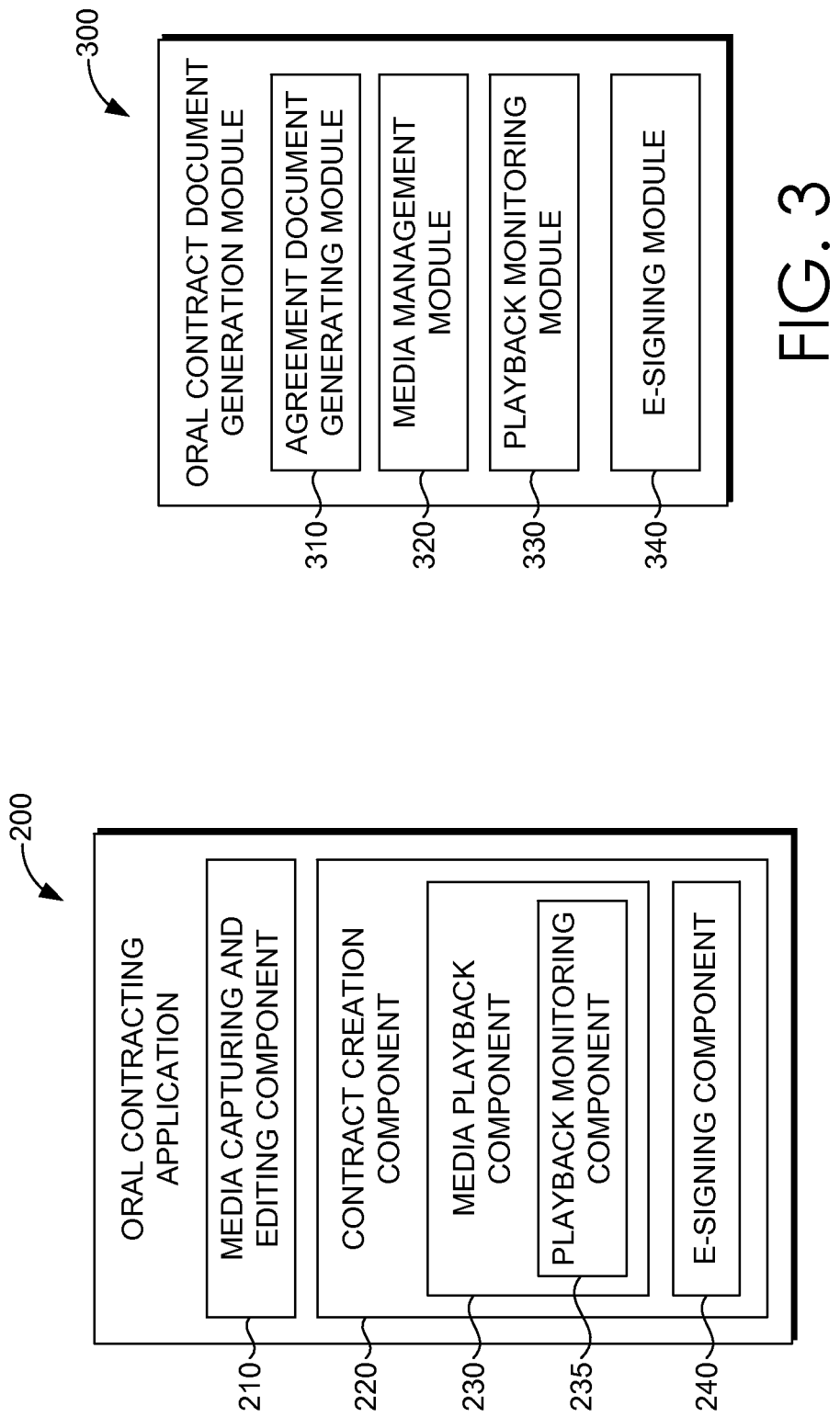

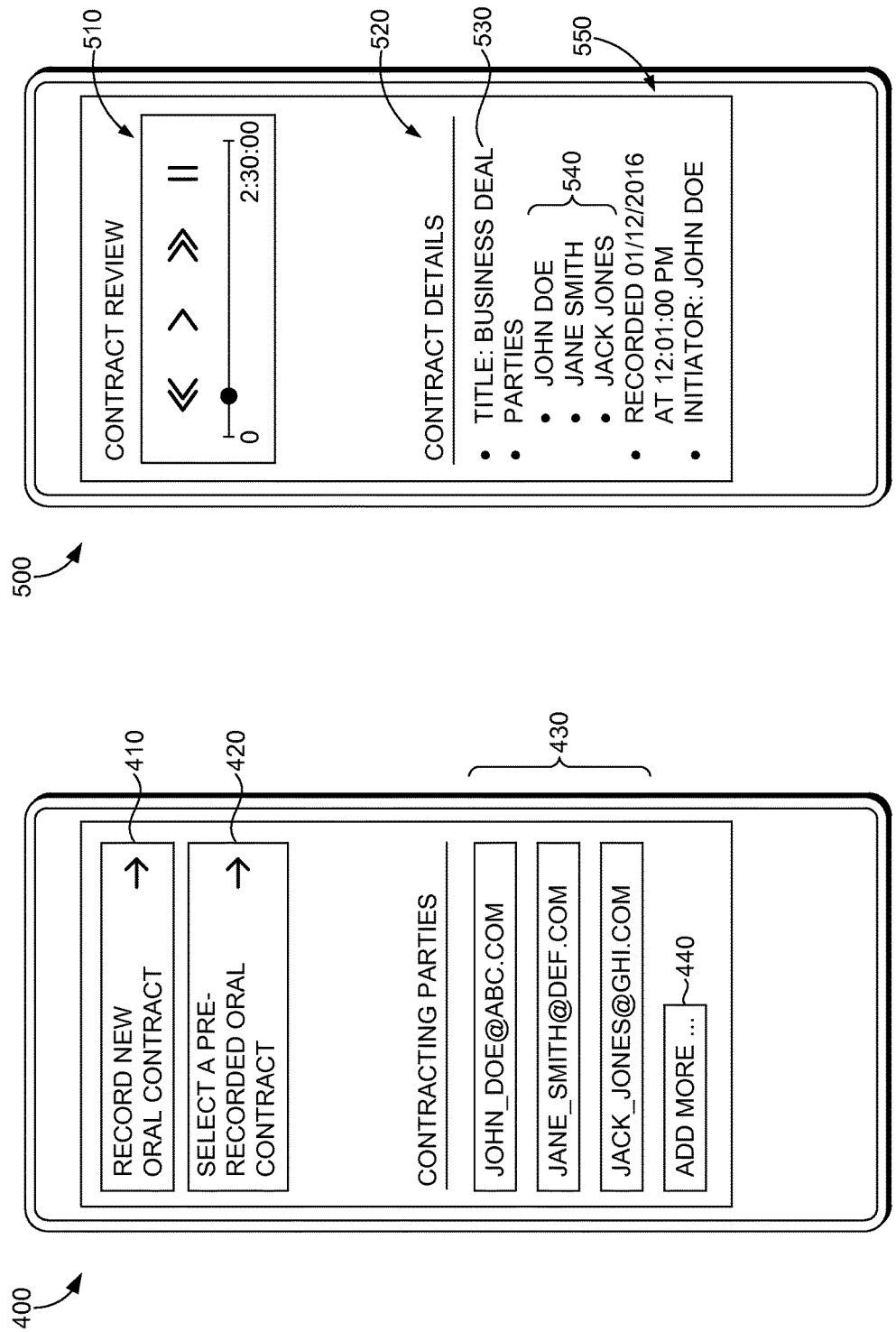

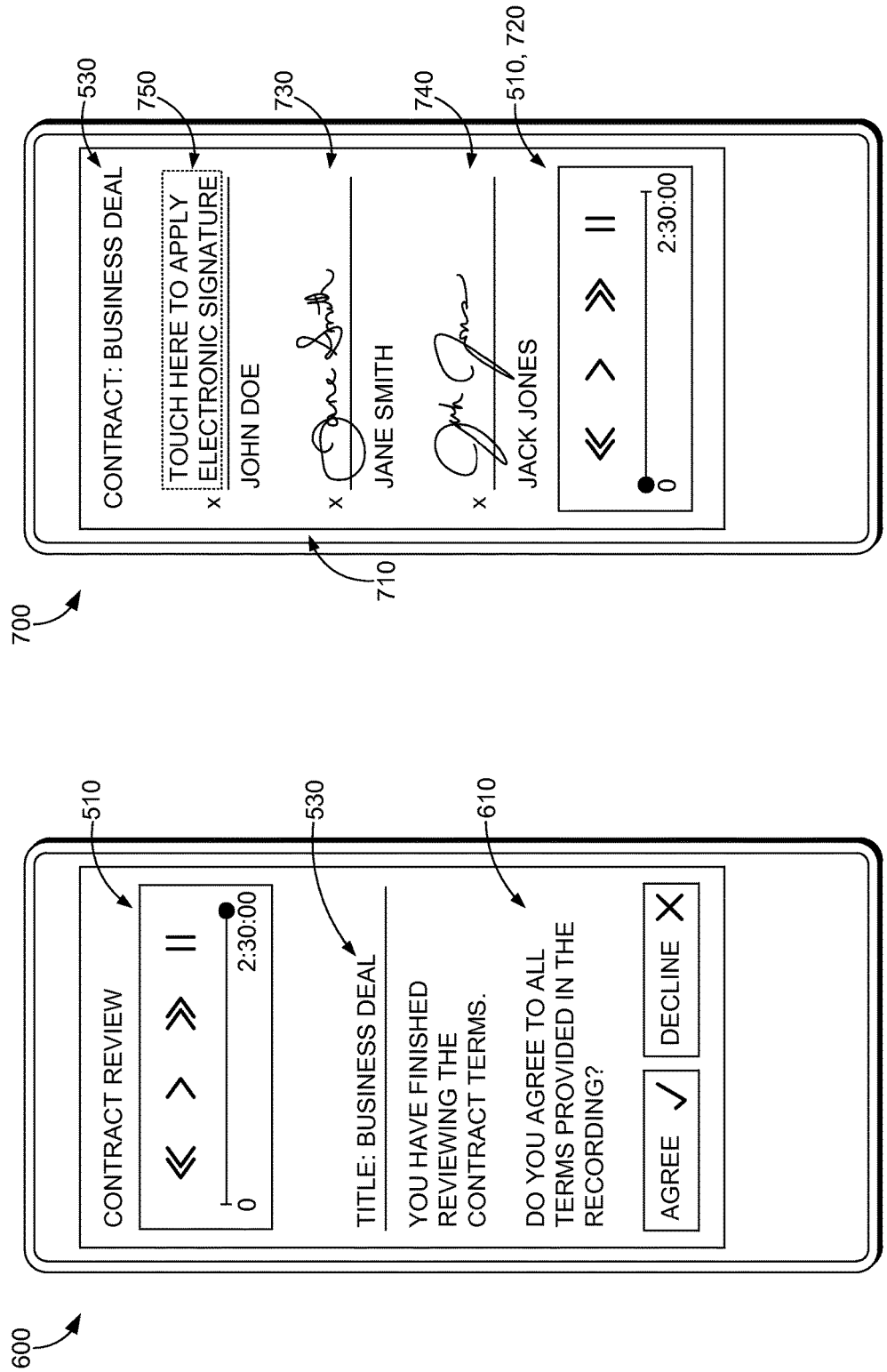

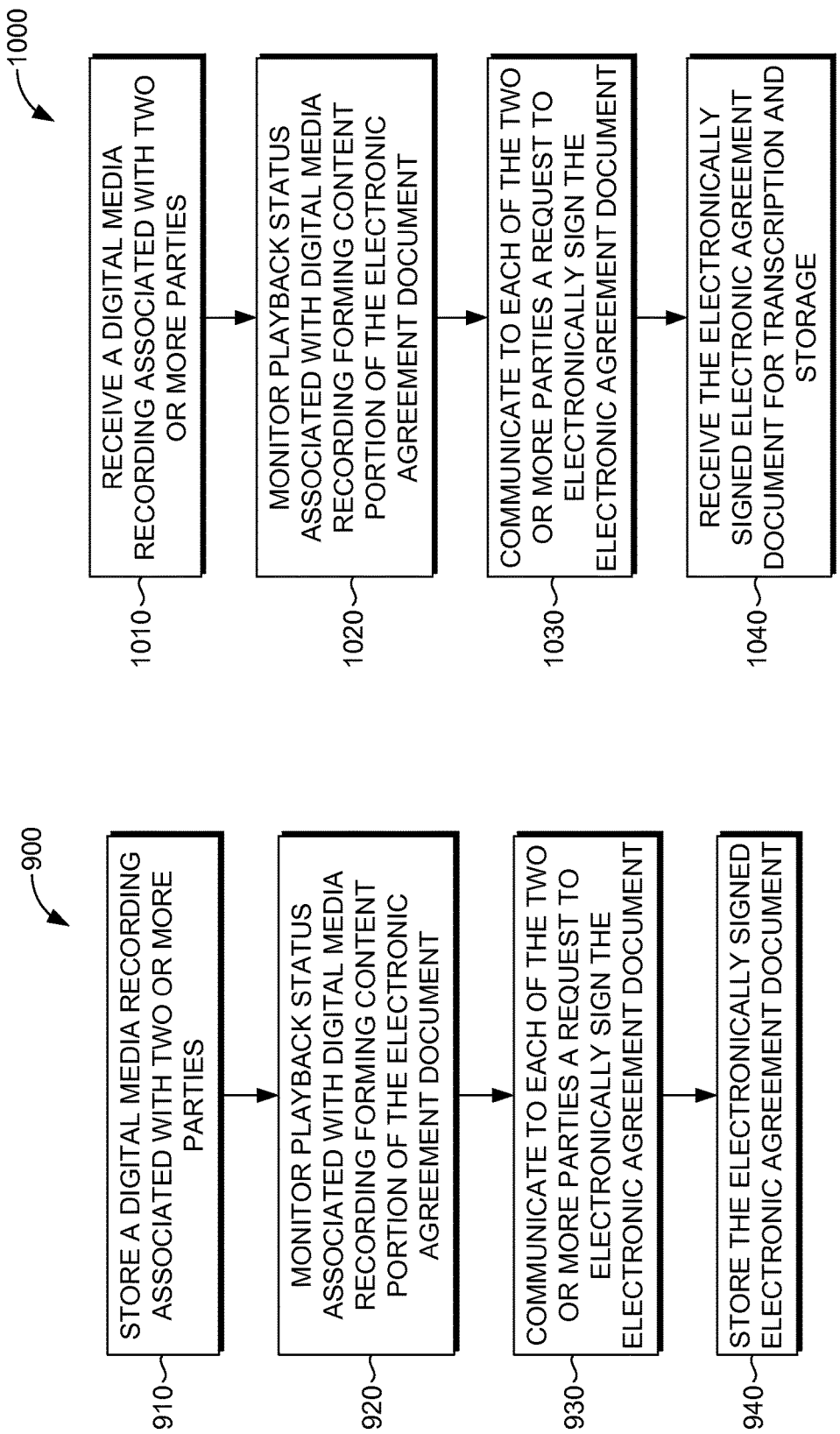

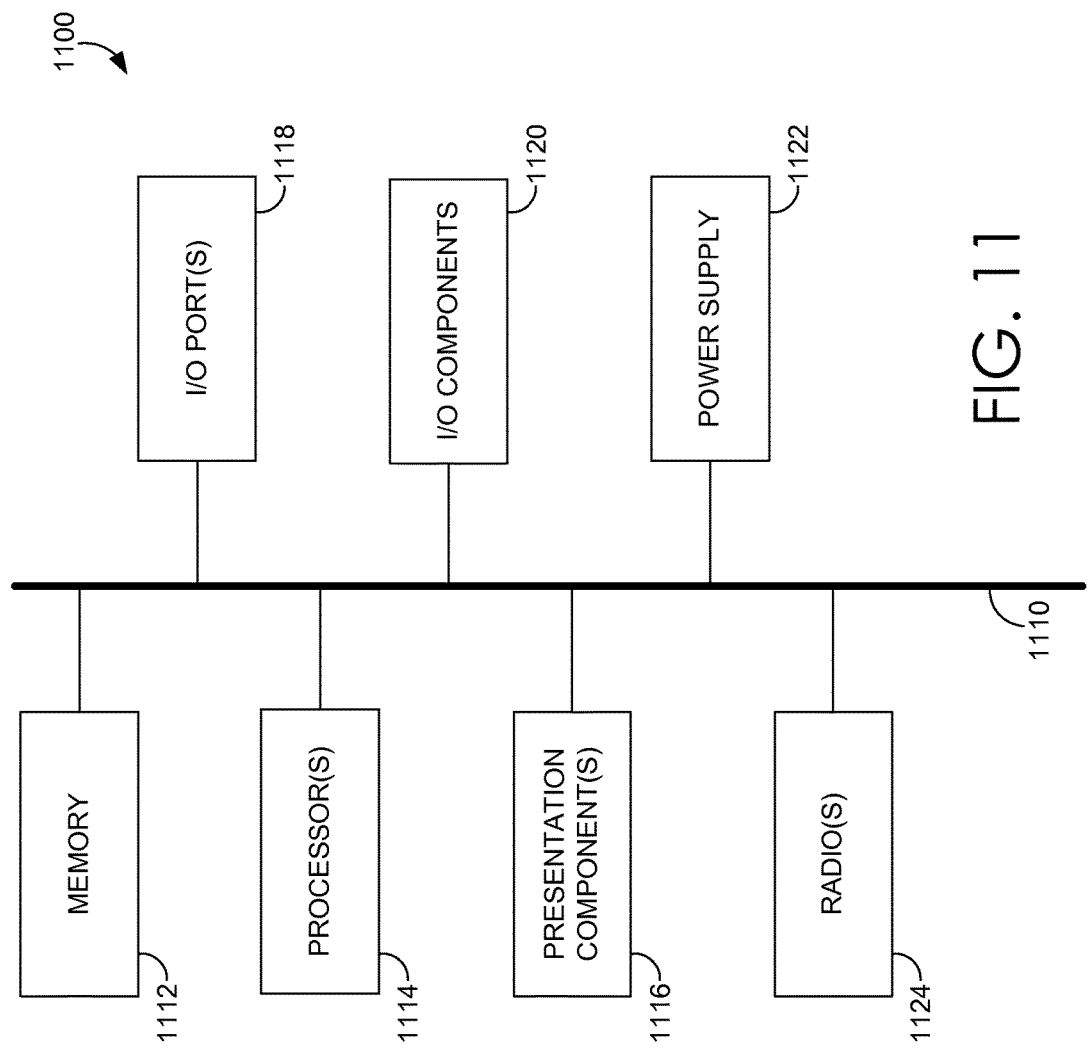

GENERATING AUTHENTICATED INSTRUMENTS FOR ORAL AGREEMENTS

BACKGROUND

Handshake agreements, oftentimes referred to as oral contracts, are generally just as valid as their written counterparts. The problem with oral contracts, however, is the difficulty in enforcing the contract terms due to an apparent lack of supporting physical evidence. People oftentimes rely on spoken agreements instead of written contracts for various reasons. More particularly, written contracts can be perceived as being too formal, can require the assistance of an expensive attorney, or can be viewed as being too time consuming.

Despite having a recording of the conversation in which the terms of the oral contract are discussed, the oral contract can still be deemed unenforceable if evaluated under laws that require supplementary written material and/or witnesses that are able to corroborate the contracting parties' mutual agreement to the terms with an intent to be bound. Moreover, many jurisdictions still require that a contract generally be evidenced in writing to be deemed enforceable.

While mobile computing technology (e.g., smart phones) is prevalent in society, the capability to record such oral contracts remains readily available. The ability to harness this technology for authenticating and verifying the contracting parties' mutual agreement to the terms would be very beneficial.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments described herein are directed to generating an authenticated instrument of an oral contract. In essence, embodiments are broadly directed to electronically verifying that each of the contracting parties have substantially reviewed the recording of the oral contract and receiving electronic signatures from each of the contracting parties authenticating the contents thereof. In this way, embodiments described herein can substantially improve the likelihood of enforceability of oral contracts by generating an audit trail and an associated electronically-signed document comprising the recording of the oral contract to decrease the likelihood of reneging by either of the contracting parties At a high level, a digital recording of an oral contract is received to form a content portion of an electronic agreement document involving two or more contracting parties. The electronic agreement document can be a digital document having content associated with the terms of the oral contract, which can be consumed by a user (i.e., a PDF document). The electronic agreement document is communicated to each of the contracting parties so that each of the contracting parties can review the content portion thereof. A playback status associated with the content portion is monitored to indicate how much of the content portion is reviewed by each of the contracting parties. In accordance with determining that the playback status indicates that all contracting parties have substantially reviewed the content portion of the electronic agreement document, a request to electronically sign the electronic agreement document is communicated to the contracting parties. Once electronically signed, the electronic agreement document is stored for reference and/or safekeeping.

BRIEF DESCRIPTION OF THE DRAWINGS

The present invention is described in detail below with reference to the attached drawing figures, wherein:

FIG. 1 is a diagram illustrating an exemplary system, in accordance with implementations of the present disclosure;

FIG. 2 is a diagram illustrating an exemplary component of the system of FIG. 1, more particularly, the oral contracting application, in accordance with implementations of the present disclosure;

FIG. 3 is a diagram illustrating an exemplary component of the system of FIG. 1, more particularly, the oral contract document generation module, in accordance with implementations of the present disclosure;

FIGS. 4-7 illustrate exemplary user interfaces of an oral contracting application, in accordance with implementations of the present disclosure;

FIG. 9 is a flow diagram showing a method for generating an authenticated instrument of an oral agreement, in accordance with implementations of the present disclosure;

FIG. 10 is a flow diagram showing a method for generating an authenticated instrument of an oral agreement, in accordance with implementations of the present disclosure; and FIG. 11 is a block diagram of an exemplary computing environment suitable for use in implementations of the present disclosure.

DETAILED DESCRIPTION

Figure 8:
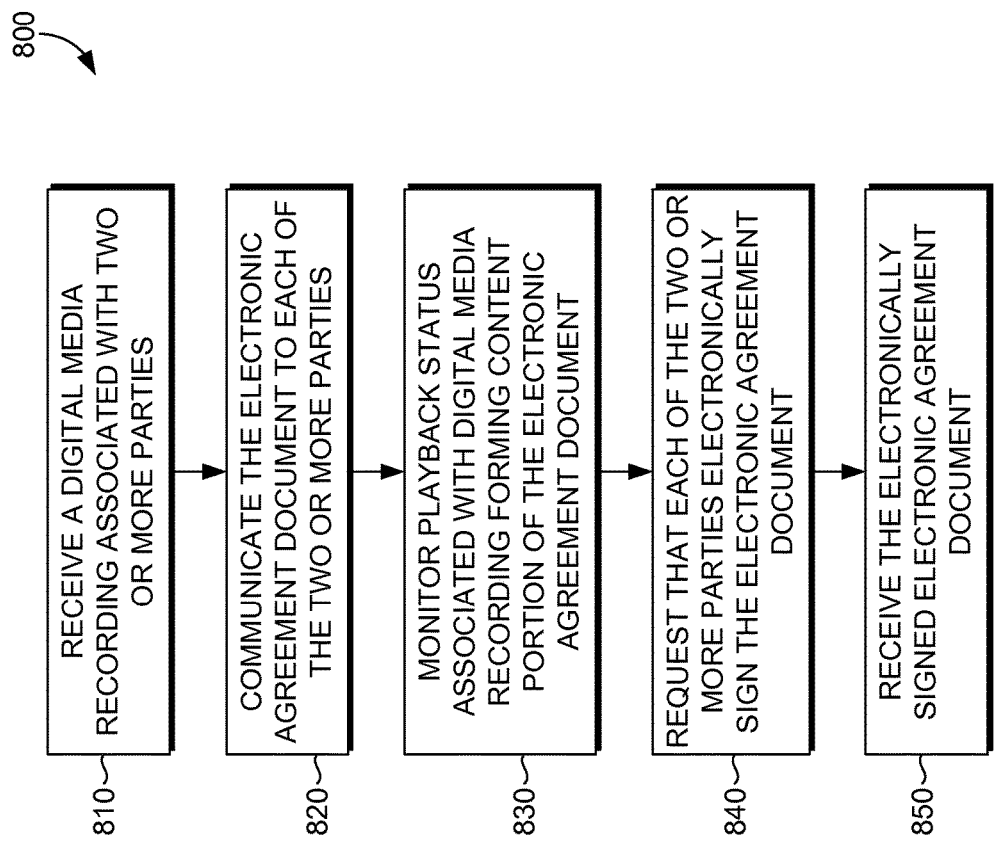
FIG. 8 is a flow diagram showing a method for generating an authenticated instrument of an oral agreement, in accordance with implementations of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

People oftentimes rely on oral contracts when conducting business. While oral agreements are more likely to form in informal settings (e.g., over lunch) or over the telephone, people still prefer such "handshake"-type agreements over their written counterparts due to high costs associated with drafting written agreements, the formality associated with forming a written contract, or even the relative ease of reneging from an oral contract. The problem with oral contracts, however, is their inherent lack of enforceability. Oral contracts can be enforceable in some instances, particularly when supported with supplementary written material and/or corroborated by witnesses that can attest to the contracting parties' mutual intent to be bound. However, such instances can be quite rare.

While it is natural for one to believe that having a recording of the conversation in which the oral contract is formed would be sufficient to enforce the contract terms, some courts have found that various defenses to contract formation and/or enforceability are available to render the recorded oral contract unenforceable. For instance, if a transaction is subject to Section 204(a) of the Copyright Act of 1976, the contracting parties' intent is irrelevant as only formal written contract is enforceable. While not all oral contracts are deemed unenforceable by the courts, it would still be highly desirable to be able to include the requirements for contract enforceability into the formation of oral contracts.

As such, embodiments described herein are directed to generating an authenticated instrument of an oral agreement. Contracting parties can record a conversation including the negotiated contract terms using any recording device, such as a mobile computing device (e.g., a smart phone). Either one or both of the contracting parties can review the recorded conversation and edit out any particular portions from the recording that they do not want as part of the recording. The recording is then sent to and received by a server configured to obtain the recording, and form a content portion of an electronic agreement document. The server then communicates the electronic agreement document to all contracting parties and determines when each of them have substantially reviewed or "played back" the recording or its transcription in the content portion. Upon determining that all parties have substantially reviewed the recording, each party is requested to electronically sign the electronic agreement to indicate that they have reviewed the content portion and agree to the contract terms. Once electronically signed by all parties, the document is stored in memory for reference or transcription, as will be described.

Accordingly, a conversation between two or more contracting parties is recorded on a computing device, such as a smart phone or a wearable device. Once the conversation is recorded, a first contracting party of the two or more contracting parties reviews the recording and removes any portions of the recording that may include undesirable content (e.g., gossip, noise, silence, interruptions, etc.). In some embodiments, any of the other contracting parties can also review the recording to further remove any undesirable portions. In essence, at least a portion of the originally recorded conversation will be satisfactory to all of the contracting parties and include the oral contract terms subject to authorization thereby. Once reviewed and trimmed, if necessary, the recording, or at least a portion thereof, along with an electronic address (e.g., email address, user account identifier, mobile phone number, etc.) associated with the contracting parties, is communicated to a remote server device over a network, such as the Internet, and stored thereon.

Once the server receives the recording, the recording is utilized to form a content portion of an electronic agreement document. The electronic agreement document can comprise any form of electronic document (e.g., a PDF file) that can be transferred, viewed, and/or manipulated by a user. The electronic agreement document represents a written material associated with the oral contract, as will be described. The server is configured to then communicate the electronic agreement document, or at least the content portion thereof, to all of the contracting parties for review. In some embodiments, the content portion of the electronic agreement can be communicated to and reviewed by the contracting parties by streaming the content portion, or in other words the recording, over a network connection. In some other embodiments, the content portion can be communicated to and reviewed by the contracting parties by delivering the content portion or an instance thereof to a computing device of the user for review, reading, or playback thereon.

In embodiments, whether streaming or playing back locally the content portion of the electronic agreement document, a playback status indicating how much of the content portion is reviewed or played back by each party is updated and monitored. The idea behind the playback status is to maintain an audit trail of each user, and to verify that each user had the opportunity to and actually reviewed the entirety of the oral contract terms. If the content portion is streamed to a contracting party, embodiments can maintain the playback status by monitoring the amount of the content portion streamed to the user over the network. In the alternative, if the content portion is communicated to a user and played back locally, a client application configured to play back the content portion may include a playback monitor configured to maintain the playback status based on how much of the content portion is reviewed or played back through the client application. In such embodiments, the playback status can then be communicated back to the server in real-time, programmatically, or upon determining that a substantial portion (e.g., 90% or more, or all portions flagged as "essential") of the content portion has been reviewed.

In various embodiments, upon determining that each party has substantially reviewed (listened/watched/read at least 90% of) the content portion of the electronic agreement document, all of the contracting parties are contacted, either through their electronic address or alerted through the client application, with a request to electronically sign the electronic agreement document in accordance with having determined that all parties have substantially reviewed the content portion. The contracting parties are then presented with a user interface for electronically signing the electronic agreement document, providing them with an opportunity to authorize the contents of the document with an attestation that they have reviewed the content portion and agree to be bound by the contract terms recorded therein.

Turning now to FIG. 1, a diagram is provided illustrating an exemplary system in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 can be a client-server system that can be utilized to generate authenticated instruments of oral agreements. Among other components not shown, the system 100 can include any number of client devices, such as client devices 110*a* and 110*b* through 110*n*, network 120, and one or more remote server devices 130. It should be understood that any number of servers and client devices may be employed within system 100 within the scope of the present disclosure. Each may comprise a single device or multiple devices cooperating in a distributed environment. Additionally, other components not shown may also be included within the distributed environment.

It should further be understood that system 100 shown in FIG. 1 is an example of one suitable computing system architecture. Each of the servers and client devices shown in FIG. 1 may be implemented via a computing device, such as computing device 1100, later described with reference to FIG. 11, for example. The components may communicate with each other via network 120.

Network 120 may be wired, wireless, or both. Network 120 may include multiple networks, or a network of networks, but is shown in simple form so as not to obscure aspects of the present disclosure. By way of example, network 120 can include one or more wide area networks (WANs), one or more local area networks (LANs), one or more public networks, such as the Internet, and/or one or more private networks. Where network 120 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 120 is not described in significant detail.

In various implementations, client devices 110a and 110b through 110n are computing devices that are capable of accessing the Internet, such as the World Wide Web. Client devices might take on a variety of forms, such as a personal computer (PC), a laptop computer, a mobile phone, a tablet computer, a wearable computer, a personal digital assistant (PDA), an MP3 player, a global positioning system (GPS) device, a video player, a digital video recorder (DVR), a cable box, a set-top box, a handheld communications device, a smart phone, a smart watch, a workstation, any combination of these delineated devices, or any other suitable device.

Client devices 110a and 110b through 110n can include one or more processors, and one or more computer-readable media. The computer-readable media may include computer-readable instructions executable by the one or more processors. The instructions may correspond to one or more applications, such as browser 112, oral contracting application 114, and/or e-signing component 116, shown on client device 110a, or oral contract document generation module 132 and/or e-signing module 134, shown on server device 130.

Browser 112, such as a web browser, can be an HTTP-compatible application (e.g. an Application that supports an HTTP or HTTPS protocol). A specific example of browser 112 is the Google® Chrome® web browser. Oral contracting application 114 may be independently installed on the client device as a standalone application, or can be accessed through a web-based application hosted by server 130 or other server(s) (not shown) and accessible to client devices by the browser 112. In some instances, the oral contracting application 114 can be accessible over the web (e.g., a dynamic web application or a cloud-based web application) through the browser 112. Accessing the dynamic web application 114 over the web can be accomplished on the client 110a by visiting a Uniform Resource Identifier (URI or URL) to receive code (e.g., HTML) for rendering, the code being dynamically generated by the server 130 and communicated to the client 110a over the network 120.

The oral contracting application 114, as will be described with further reference to FIG. 2, can be configured to record and/or receive a digital recording of an oral contract involving two or more contracting parties. In some embodiments, the oral contracting application can include some basic audio/video editing tools operable to cut out various undesirable portions of the recording. The oral contracting application 114 can also include basic media playback functionality, configured to enable a user to review a recorded media stored locally or via a network stream, as will be described. Aspects of the oral contracting application 114 can further include components that facilitate the updating and monitoring of a playback status associated with the recorded media, as will also be described. Some other aspects can include communication features that can enable a user to distribute, among other things, the digital recording of the oral contract to each of the contracting parties for review.

In some embodiments described herein, the oral contracting application 114 can include an e-signing component 116 configured to at least present a document having content available for review to a user, and further receive a digital/electronic signature from the user for association with the document. For instance, if the document is an electronic document such as a portable document format (PDF) file, the e-signing component 116 can be configured to display the PDF file and enable the user to electronically sign the document by inserting a locally stored image of the signature, or similarly, can be configured to receive an electronic signature from the user manually (i.e., via stylus or finger). The e-signing component 116 can be configured to interface with the oral contracting application 114 to perform at least the function of presenting a document and receiving electronic signatures for application and/or association thereto, or can be configured as a component of the oral contracting application 114 providing a seamless e-signing experience to the user, whereby the aforementioned e-signing features are included as a feature of the oral contracting application 114. A specific example of an e-signing component 116 is the client component of Adobe® eSign service in Adobe® Document Cloud®. The e-signing component 116 can be configured to interface with the oral contracting application 114 so that the electronically signed document is communicated there between, or can be communicated there through for interoperability and exchange of resources, such as documents and credentials.

The oral contracting application 114 can also be configured to exchange contract data with the server 130 over the network 120. The contract data can include recording(s) of oral contract communications, electronic agreement documents, user information and access credentials, contract notes and messages for exchange between contracting parties, supplementary contract materials, and the like. The contract data can be communicated from the client 110a to the server 130 in real-time, in predetermined intervals, or programmatically (e.g., when initiated by the user).

The server 130 can include one or more server computing device(s) comprising at least an oral contract document generation module 132, an e-signing module 134, and a memory 136. The server 130 can include a plurality of computing devices configured in a network environment, or can include a single computing device hosting each of the oral contract document generation module 132, e-signing module 134, and memory 136. Each server computing device can include one or more processors, and one or more computer-readable media. The computer-readable media may include computer-readable instructions executable by the one or more processors. The instructions may correspond to one or more applications, such as oral contract document generation module 132 or e-signing module 134, shown on server device 130. The server 130 can be configured to store, among other things, a plurality of electronic agreement documents, recordings of oral contracts, user electronic addresses and account information, digital certificates for verifying user electronic signatures, and more, in a memory 136. Memory 136 can be comprised of one or more computer-readable media, or may comprise one or more database(s) (not shown) for storing data, as can be appreciated by one of ordinary skill in the art.

As will be described with particular reference to FIG. 3, the oral contract document generation module 132 of server 130 can include modules for receiving media files comprising recording(s) of oral contracts between two or more parties, generating electronic agreement documents having a content portion and a verification portion, streaming media files for playback to users for review of the oral contract, and/or monitoring a playback status of an oral contract recording for each user. As was similarly described with respect to oral contracting application 114, the oral contract document generation module 132 can interface with the e-signing module 134 that is configured to provide e-signing features to electronic agreement documents generated by the oral contract document generation module 132. As was described in parallel to the client-side e-signing component 116 of client device 110a, a specific example of an e-signing module 134 on the server 130 is the server component of Adobe® eSign service in Adobe® Document Cloud®.

The oral contract document generation module 132 can comprise a web server, such as Apache®, IIS®, Nginx®, or GWS®, among many others, and is configured to communicate over the network 120 to provide modules and/or services for generating authenticated instruments of oral agreements to users on a client device via browser 112 or oral contracting application 114. While the standard network protocol for communication is HTTP or HTTPS, it is contemplated that any network protocol can be used to distribute information between the oral contract document generation module 132 and the oral contracting application 114 of client device 110a. In more detail, if the oral contracting application 114 is communicated to the client device 110a over the World Wide Web and accessed via browser 112, the oral contract document generation module 132 can be configured to provide HTML webpages, or the like, to users for navigating a workflow directed to generating authenticated instruments of oral agreements. If the oral contracting application 114 is a standalone application installed on the client device 110a, and is configured to communicate with the oral contract document generation module 132 over network 120 (e.g., the Internet), oral contract document generation module 132 can be configured to provide framework data (e.g., XML or JSON or binary data) and/or content data (e.g., media files or PDF documents) for rendering by the oral contracting application 114 so that consumers can navigate through the instrument generating workflow.

Moving now to FIG. 2, a diagram is provided illustrating an exemplary oral contracting application in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The oral contracting application 200 of FIG. 2 includes a media capturing and editing component 210 and a contract creation component 220. As will be described, the contract creation component 220 can also include a media playback component 230 and a playback monitoring component 235. In the provided illustration, the oral contracting application 200 also includes an e-signing component 240. However, it is contemplated that some embodiments of the oral contracting application 200 must not necessarily include the e-signing component 240, but can interface with a component that is configured to provide such e-signing features, such as e-signing component 116 of FIG. 1. In some embodiments, the oral contracting application 200 can be configured to provide or render a user interface (not shown) of the e-signing component 240 that is communicated thereto by oral contract document generation module 132 and/or e-signing module 134 of FIG. 1. It is further contemplated that the oral contracting application 200 is configured to operate on a computing device, interface with various components of the computing device's operating system and available hardware, and communicate with other computing devices (for instance, server 130 of FIG. 1) over a network.

In some embodiments, the media capturing and editing component 210 can be configured to interface with media hardware (e.g., microphone and/or video camera) on the client computing device. In this regard, the media capturing and editing component 210 is configured to initialize the media hardware to capture (i.e., record) a digital media recording of a conversation in response to a user input. For example, a user may initiate a recording of a conversation when the user and one or more other contracting parties are anticipating an oral contract. The recording can be an audio recording or a video (with audio) recording. In another example, if the oral contracting application 200 is executed on a mobile computing device (e.g., a smart phone), the media capturing and editing component 210 can be configured to record a telephone call on which the oral contract is taking place. In instances where the mobile computing device is incapable of recording a live telephone conversation, the oral contracting application 200 may be configured to initiate a voice-over-IP (VOIP) call with the involved contracting parties and then record the conversation. In the various described workflows, the oral contracting application 200 may be configured to prompt the contracting parties to orally consent to the recording.

In some other embodiments, the media capturing and editing component 210 can also be configured to receive a digital media recording from a memory (not shown). In other words, the media capturing and editing component 210 can receive or reference a digital media recording or file that is stored on a memory of the client computing device. In this regard, the digital media recording could have been recorded previously by the user, or sent to the user, and selected by the user for review and/or editing by media capturing and editing component 210.

The media capturing and editing component 210 can also be configured to perform editing tasks on the recording. Editing tasks can include trimming, deleting, reviewing, skimming, etc., at least portions of the recording. In essence, the media capturing and editing component 210 provides a user with tools for editing a recording to include only portions of a recording that are relevant to the oral contract and its terms. In this regard, if a user records a conversation that includes therein an oral contract, the user can modify the recording to "clip" or cut out the irrelevant portions of the conversation so that only the contract terms are included in the recording. In some embodiments, the entire recording may still be preserved in storage (e.g., local device memory or server memory), even though the contracting parties have only agreed to a clipped portion of the recording. Unedited recordings can be stored so that subsequent review of the recording contents can be reviewed for disambiguation of contract terms, if so required.

The oral contracting application 200 can also be configured to initiate, in response to a user input, a workflow directed to the generation of an authenticated instrument of the oral contract or agreement that is the subject of the recording. In essence, the user can initiate a workflow configured to create an electronic document that includes the recording or transcription of the oral contract for review and verification by all contracting parties. In more detail, the user can provide the contact creation component 220 with the final version of the recording (i.e., the edited version of the recording) along with electronic addresses (e.g., email addresses, user account identifiers, mobile phone numbers, etc.) of the contracting parties that are associated with the oral contract. In response to the foregoing, the contract creation component 220 can communicate the recording, or at least a portion thereof, to the oral contract document generation module 132 of FIG. 1.

As will be described, the oral contract document generation module 132 of FIG. 1 can be configured to receive the recording and generate therefrom a content portion of an electronic agreement document. Moreover, the oral contract document generation module 132 can initiate review and verification workflows with the contracting parties by sending, in some embodiments, a Uniform Resource Identifier (URI) associated with the electronic agreement document. For example, the oral contract document generation module 132 can be configured to contact the contracting parties (including the initiating user, in some embodiments) using the electronic addresses provided thereto by the user and sending them each, using their electronic addresses, a URI associated with the electronic agreement document. Once the contracting parties are contacted and their respective workflows are initiated, each party, including the initiating user, can be provided with an opportunity to review at least the recording (hereinafter also referred to as "the content portion") and electronically sign the electronic agreement document, as will be described.

With brief reference to FIG. 1, each contracting party can be alerted, either via their electronic address or through a push notification associated with an oral contracting application 114 provided on their respective client device(s) 110a, that an electronic agreement document creation workflow has begun in response to the initiating user's submission. The oral contracting application 114 can be configured to communicate with the oral contract document generation module 132 to receive contract data for review and verification. In embodiments, the URI provided to the contracting parties can identify, with particularity, which workflow on the server 130 is the subject workflow. In this regard, each contracting party is perceived as a user of their respective oral contracting applications 114.

With reference back now to FIG. 2, the user is provided with the opportunity to review (i.e., listen to, "play back", or read the transcription of) the content portion of the electronic agreement document using media playback component 235. In some embodiments, media playback component 235 can be configured to access the content portion utilizing the provided URI. Once the electronic agreement document is accessed, the content portion is reviewed either through streaming or by listening to a downloaded copy. In embodiments, the media playback component 235 can be configured to present to the user a media playback interface having at least basic playback functionality (e.g., rewind, play, fast forward, pause, etc.). The media playback component 235 can further communicate with the oral contract document generation module 132 of FIG. 1 to receive the content portion of the electronic agreement document. In this way, the user can listen to the recording of the content portion and review the recorded terms of the oral contract.

The media playback component 235 can also include a playback monitoring component 235 configured to monitor an amount of the content portion that is reviewed by the user. The playback monitoring component 235 can determine, in some embodiments, a percentage of the content portion that is actually played back by the user and further track which portions of the content portion are played back (not skipped or fast-forwarded through) and/or not played back for review. In one embodiment, if the content portion is streamed or downloaded to the oral contracting application, the playback monitoring component can be configured to determine, based on a timeline associated with the provided stream, which frames of the content portion are played back over the media playback component 230. For example, if the content portion includes a recording of two minutes and thirty-five seconds (02:35:00), a timeline starting from zero to two minutes and thirty-five seconds will be provided to the user and tracked, to determine which frames there between have been played back to the user. If it is determined that the user played back two minutes and thirty seconds (02:30:00) of the entire duration (02:35:00), then the playback monitoring component 235 may determine that approximately ninety-seven percent (97%) of the content portion has been played back by the user. In another embodiment, if the content portion is streamed, the playback monitoring component 235 can be configured at least partly on the oral contract document generation module 132 of FIG. 1 to determine a real-time percentage of the content portion that is streamed to the media playback component 235 for review. In other words, the amount of the content portion that is streamed in real-time to the user's media playback component 235 is equivalent to the percentage of the content portion played back to the user.

While various embodiments are described herein for determining an amount or percentage of the content portion played back or reviewed by the user, it is contemplated that various other methods can be employed. For instance, code can be embedded into media players or even the media files themselves, for tracking which portions have been played or viewed by any one particular user. In another instance, dynamic scripts and/or cookies can be employed to monitor and/or track playback percentages and the like. In some instances, a media playback component 235 may be configured to track playback of the content portion in an "offline" mode, such that the data associated with the playback status is reported to the server once connected to a network, such as the Internet. In any of the disclosed embodiments, the data associated with the playback status can include the amount of times any particular frame or timestamp of a recording are played back to a user.

Once the oral contract document generation module 132 of FIG. 1 determines that each of the contracting parties have reviewed at least a substantial portion of the content portion of the electronic agreement document, as will be described, the contracting parties are provided with an opportunity to electronically sign and authorize their assent to be bound by the terms of the oral contract. At this juncture, the e-signing component 240 is configured to receive authorization from the oral contract document generation module 132 of FIG. 1 to present to the user, for signature, the electronic agreement document. The electronic agreement document can be a portable document format (PDF) document having the reviewed content portion embedded therein. The electronic agreement document and/ or its associated audit log can also include basic details of the oral contract, such as party names, electronic address information, date and/or time of agreement, content portion playback percentages or playback statuses of each party, signature blocks, etc. The user will be provided with a user interface for reviewing the electronic agreement document and also for electronically signing the electronic agreement document. As was described herein above, the user is provided with an interface to electronically sign the electronic agreement document by employing e-signing component 240, which associates the user's electronic signature with the electronic agreement document. Once signed, the signed electronic agreement document is communicated back to the oral contract document generation module 132 for passage onto other contracting parties or for generating a single electronic agreement document comprising all electronic signatures of the contracting parties. As will be described, the electronic agreement document is then stored on the server 130 of FIG. 1.

Moving now to FIG. 3, a diagram is provided illustrating an exemplary oral contract document generation module in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The oral contract document generation module 300 of FIG. 3 can include an agreement document generation module 310, a media management module 320, and a playback monitoring module 330. In the provided illustration, the oral contract document generation module 300 also includes an e-signing module 340. However, it is contemplated that some embodiments of the oral contract document generation module 300 must not necessarily include the e-signing module 340, but can interface with an external module that is configured to provide such e-signing modules, such as e-signing module 134 of FIG. 1. In some embodiments, e-signing module 340 is configured to prepare an electronic document for electronic signature(s) for one or more contracting parties. For example, the e-signing module 340 receives the electronic agreement document from oral contract document generation module 300 and generates electronic signature blocks thereon, wherein each signature block is associated with one of the contracting parties. The e-signing module 340 can also be configured to present directly or indirectly through oral contract document generation module 300 the electronic agreement document, receive electronic signature(s) from one or more users, and apply/associate the electronic signature(s) to the electronic agreement document. While not disclosed herein, one of ordinary skill in the art can appreciate that the e-signing module 340 may also include or interface with a certificate authority for authenticating the electronic signatures of the contracting parties.

The agreement document generating module 310 is configured to receive a digital media recording, for instance, a digital media recording of an oral contract, and embed the digital media recording into a newly generated electronic agreement document. The digital media recording or file can be communicated to the agreement document generating module 310 from a user through an oral contracting application, such as oral contracting application 114 of FIG. 1. The electronic agreement document can be any electronic document that is configured to at least receive a digital media recording for storage therein and further receive one or more electronic signatures thereon. In some embodiments, the electronic agreement document is a portable document format (PDF) file. The electronic agreement document is configured to store contract data and present at least portions of the contract data on a visible portion of the document. In some embodiments, when generating an electronic agreement document, the agreement document generation module 310 can form at least a content portion and a verification portion. The content portion is configured to store, among other things, at least portions of a digital media recording of an oral contract. The verification portion, in some embodiments, can be configured to receive electronic signatures for application and association with the electronic agreement document. It is contemplated that once an electronic agreement document is signed, verified, and authenticated by all contracting parties subject to the oral contract, the oral contract document generation module 300 or sub-component thereof can modify the electronic agreement document, such that it can no longer be edited or modified.

The oral contract document generation module 300 is also configured to receive, along with the digital media recording, electronic addresses for each contracting party subject to the oral contract. In response to receiving the digital media recording and electronic addresses of the contracting parties, the oral contract document generation module 300 is configured to communicate the electronic agreement document, or an instance thereof, to each of the contracting parties using the electronic addresses. In some embodiments, the oral contract document generation module 300 can be configured to generate a URI associated with the contract data (i.e., data relevant to an oral contract including the electronic agreement document) and communicate the URI to the contracting parties. In this regard, the URI provides access to the electronic agreement over a network, such as network 120 of FIG. 1. In some embodiments, the URI provides the contracting parties with web-access to the contract data. In other embodiments, the URI provides the oral contracting application (such as oral contracting application 114 of FIG. 1) with contract data for presentation to the user. In some embodiments, the contract data can be associated directly with the user and/or a user account, such that the contract data will be available to a user upon logging into the oral contract document generation module 300 using appropriate credentials.

Once a user accesses the electronic agreement document, either via URI or upon logging into the oral contract document generation module 300 with proper account credentials, the oral contract document generation module 300 is configured to provide the user with an opportunity (or many opportunities) to review the content portion of the electronic agreement document. To this end, the oral contract document generation module 300 includes a media management module 320 that is configured to provide the user with access to the content portion of the electronic agreement document. In other words, the media management module 320 provides access to the recorded media, including the recorded oral contract, stored in the content portion of the electronic agreement document. In one embodiment, the media management module 320 provides the content portion of the electronic agreement document to a user by making the content portion available for download to a client device, only if the client device is in communication with the oral contract document generation module 300 using an oral contracting application, such as oral contracting application 114 of FIG. 1. In this way, the content portion remains within a controlled system for purposes of playback monitoring, as will be discussed. In another embodiment, the media management module 320 provides the content portion of the electronic agreement document to a user by streaming the content portion to an oral contracting application, such as oral contracting application 114 of FIG. 1.

As was described with respect to playback monitoring component 235 of FIG. 2, as a user is reviewing the content portion of an electronic agreement document, the playback monitoring component 235 is configured to determine a percentage of the content portion reviewed by the user. To this end, the oral contract document generation module 300 of FIG. 3, can be configured to communicate with the oral contracting application(s) to at least receive, from each user or "contracting party," the percentage of the content portion reviewed thereby. The playback monitoring module 330 can thereby retain a playback status for each contracting party to determine whether each user has substantially reviewed the content portion of the electronic document. If a user is determined to have substantially reviewed the content portion, their playback status may be changed to "contract terms reviewed", "review complete", or the like. In another embodiment, a user may be asked to read through the transcribed text of the audio recording, and "playback monitoring" component 235 can be configured to determine the percentage of the transcribed text read. Such determination can be facilitated using speech-to-text engines or other natural language processing engines. In this regard, when each user has substantially reviewed the content portion, their "review status" may be changed to "contract terms review complete."

To be substantially reviewed, in one embodiment, the percentage of the content portion reviewed by (or in some embodiments, streamed to) a user must exceed at least a predetermined threshold value. The predetermined threshold value, such as 80% or 90% can be set by a user that initiates the electronic agreement document generation workflow, or can be a static value (e.g., 90%) that is universal to all contracting parties. In the alternative, the threshold value can be dynamically determined by the oral contract document generation module 300 utilizing, for instance, a signal analysis on the content portion determining how much silence is in the recording. For example, if a two-minute recording included about ten seconds of silence, a substantial review can be determined as being about ninety-two percent (92%) of the content portion (110 seconds of 120 seconds). In this regard, the threshold value for determining substantial review of the content portion can be based on an amount of silence detected in the content portion of the electronic agreement document.

In another embodiment, to be substantially reviewed, the "essential portions" of the content portion of the electronic agreement document must be reviewed or played back by each of the contracting parties. In embodiments, any one of the contracting users may be provided with an interface for flagging parts of the digital recording in the content portion. For example, users can "tag" portions of the content portion by highlighting or flagging certain contract terms (oral or written) that are included in the content portion of the electronic agreement document. In this regard, any one of the contracting parties can be provided with an opportunity to ensure that each of the contracting parties have reviewed or played back the portion of the agreement that is of particular importance to them. To this end, substantial review of the content portion can include either a percentile requirement of the entire digital recording, playback requirements of at least the essential portions of the digital recording, or a combination of both.

The playback monitoring module 330 can be configured to monitor the playback status associated with each of the contracting parties. Once the playback monitoring module 330 determines that each contracting party has substantially reviewed the content portion of the electronic agreement document, the oral contract document generation module 300 is configured to communicate a request to the contracting parties to electronically sign the electronic agreement document. In this regard, the contracting parties can only verify the contents of the electronic agreement document once the oral contract document generation module 300 has determined that each contracting party has had the opportunity to review the contract terms in good faith. The oral contract document generation module 300 then initializes or instantiates the e-signing module 340 to receive an electronic signature for each contracting party. As was discussed herein, the e-signing module 340 is configured to apply and/or associate electronic signature(s) to a verification portion of the electronic agreement document. In some embodiments, upon receiving at least one electronic signature to the electronic agreement document, the e-signing module 340 or other component of the oral contract document generation module 300 is configured to modify permissions associated with the electronic agreement document as read-only, so that the content therein can no longer be manipulated.

In some embodiments, the oral contract document generation module 300 includes an oral contract transcription module (not shown). The oral contract transcription module can include components configured to generate a written transcript of an audio layer of an electronic agreement document's content portion. In some instances, a third-party transcription service or module can be employed to convert the audio layer of the content portion of the electronic agreement document into text. To this end, the transcript can be employed in various scenarios, such as searching for oral contracts, searching for the occurrence of terms in oral contracts, providing a written transcript on the face of the electronic agreement document, and more.

Moving now to FIGS. 4-7, illustrations of exemplary user interfaces for generating an authenticated instrument of an oral agreement are provided in accordance with the present disclosure. The provided illustrations are merely exemplary and are not intended to be limiting. Looking now at FIG. 4, a contract initiation interface 400 of an oral contracting application, such as oral contracting application 114 of FIG. 1 and 200 of FIG. 2, is provided. The contract initiation interface 400 provides a user (here, an initiating user) with an option to initiate an electronic agreement document generating workflow, in accordance with embodiments described herein.

The contract initiation interface 400 provides the user with an option to create 410 a new digital media recording, or to select 420 a previously-recorded conversation including an oral contract. The contract initiation interface 400 also provides the user with an option to provide electronic addresses of one or more contracting parties 430 that are either going to be part of the new digital media recording, or were participants in the previously-recorded conversation including the oral contract. As recording and editing digital media is generally well-known in the art, exemplary illustrations thereof are not provided herein. However, the omission of such does not provide that such processes are known in the realm of generating authenticated instruments of oral-contracts. In some embodiments, digital media editing interface can be configured to detect silences and/or completion of sentences by utilizing either deep learning or layering back transcribed text over audio, and provide clipping over sentence boundaries instead of vanilla clipping. Such configurations can significantly reduce the effort required by a contract-initiating user when reducing the oral discussion to essence of the contract.

Moving now to FIG. 5, a contract review interface 500 of an oral contracting application, such as oral contracting application 114 of FIG. 1 and 200 of FIG. 2, is provided. The contract review interface 500 provides a user (here, each of the contracting parties) with an option to review the electronic agreement document, in accordance with embodiments described herein. The contract review interface 500 is configured to provide the user with a media review interface 510 to a media playback component, such as media playback component 230 of FIG. 2. The media review interface 510 is configured to at least provide basic playback functionality to a user for reviewing the content portion of the electronic agreement document. Moreover, the contract review interface 500 provides a visual representation of metadata, transcribed text overlaid in a timeline associated with the oral/video recording, or other details 520 associated with the electronic agreement document. In the provided example, the contract details 520 include a title 530 of the contract, parties 520 associated with the contract, and other details 550 or metadata (e.g., initiator and timestamps).

Looking to FIG. 6, a completion of review interface 600 of an oral contracting application, such as oral contracting application 114 of FIG. 1 and 200 of FIG. 2, is provided. The completion of review interface 600 provides a user (here, each of the contracting parties) with an option to confirm 610 that they agree to or assent to all of the terms discussed in the content portion of the electronic agreement document. It is contemplated that the completion of review interface 600 will only be presented to the user in response to the oral contracting application 200, via playback monitoring component 235 of FIG. 2, confirming that the user has substantially reviewed the content portion of the electronic agreement document, as was described herein above.

Once the user's assent or agreement to be bound to the contract terms is received (e.g., the user selects the "agree" option on completion of review interface 600), the verification portion of the electronic agreement document is presented on verification interface 700 of FIG. 7. The verification portion of the electronic agreement document includes a visualization of the verification portion 710 and the substantially-reviewed and mutually agreed upon content portion 720. The verification interface 700 provides the contracting parties with an opportunity to again review the content portion by providing a media review interface 510, as was similarly provided in FIGS. 5 and 6. The verification interface 700 also provides a visual representation of the electronic signatures 730, 740 received by the contracting parties. As was described with respect to e-signing component 240 of FIG. 2, the user is presented with an electronic signature interface 750 operable to electronically sign the electronic agreement document in response to a user input. In some embodiments, the user selects a "stamp-like" electronic signature for placement on the electronic signature interface 750. In other embodiments, the user touches the electronic signature interface 750 to initiate the receipt of a gesture-based signature for placement on the electronic signature interface 750. It is contemplated, however, that any method for inputting an electronic signature into the electronic signature interface 750 can be utilized within the scope of the present disclosure.

Having described various aspects of the present disclosure exemplary methods are described below for generating an authenticated instrument of an oral agreement. Referring to FIG. 8 in light of FIGS. 1-3, FIG. 8 is a flow diagram showing a method 800 for generating an authenticated instrument of an oral agreement. Each block of method 800 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 810, at least a portion of a digital media recording of a conversation is received on a server. By way of example, a user participating in the conversation may have recorded a conversation of an oral contract with at least one other contracting party. The user and/or the at least one other contracting party can review the recording and agree upon a final version of the recording that captures the full terms of the oral contract. The user can then submit the digital media recording (or the trimmed portion thereof) to the server for storage.

The at least a portion of the digital media recording is used (for instance, by oral contract document generation module 132 of FIG. 1) to form a content portion of an electronic agreement document involving or associated with two or more parties. By way of example, the electronic agreement document can be a portable document format (PDF) document that embeds the digital media recording therein to form the content portion. The PDF document can provide an interface for reviewing the embedded digital media recording, and can also include a visual interface for viewing metadata or other visual characteristics of the electronic agreement document. For instance, names of contracting parties, signature blocks, dates, titles, contract terms, transcriptions of the contract, etc., can all be viewable on the face of the electronic agreement document.

At block 820, the electronic agreement document is communicated to each of the two or more parties (i.e., by sending a copy thereto or sending a URI to a remote storage location). By way of example, the electronic agreement document is transmitted, over the network, to each of the contracting parties by sending a URI or other reference directed to the electronic agreement document to an electronic address (e.g., email address, user account, etc.) associated with each contracting party.

At block 830, a playback status associated with the content portion of the electronic agreement document is monitored. The playback status is configured to indicate an amount of the content portion of the electronic agreement document is reviewed by each of the two or more parties. By way of example, each contracting party, upon receiving their reference to or copy of the electronic agreement document, can play back the content portion of the electronic agreement document. To this end, the percentage of the content portion reviewed by each contracting party is monitored until it is determined that each contracting party has substantially reviewed (i.e., listened to 90%) of the digital media recording in the content portion.

At block 840, a request is communicated to each of the two or more parties. The request asks that each of the two or more parties electronically sign the electronic agreement document in accordance with the determination that the playback status associated with the content portion of the electronic agreement document indicates that each of the two or more parties have at least substantially reviewed the content portion of the electronic agreement document. By way of example, each contracting party is provided with an alert via their electronic address or e-signing application, the alert indicating that all parties have agreed to the terms of the oral contract. To this end, each of the parties can review the final version of the electronic agreement document, listen to the content portion, and electronically sign the electronic agreement.

At block 850, the electronically signed electronic agreement document is received from each of the two or more parties for storage on the server. By way of example, storage of the electronically signed electronic agreement provides each of the contracting parties an opportunity to retrieve the mutually agreed-upon electronic agreement document. In some embodiments, the server can automatically transcribe the content portion of the electronic agreement portion so that the oral contract terms can be searched, sorted, or translated for various purposes.

Referring now to FIG. 9, in light of FIGS. 1-3, FIG. 9 is a flow diagram showing a method 900 for generating an authenticated instrument of an oral agreement. Each block of method 900 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 910, at least a portion of a digital media recording of a conversation is stored on a server. The digital media recording, or portion thereof, is configured to form (for instance, using oral contract document generation module 132 of FIG. 1) a content portion of an electronic agreement document involving or associated with two or more parties. At block 920, a playback status associated with the content portion of the electronic agreement document is monitored. The playback status is configured to indicate a percentage or amount of the content portion of the electronic agreement document reviewed by each of the two or more parties. At block 930, a request is communicated to each of the two or more parties to electronically sign the electronic agreement document in accordance with determining that the playback status indicates that each of the two or more parties have at least substantially reviewed the content portion of the electronic agreement document. At block 940, the electronically signed electronic agreement document is stored on the server.

Referring now to FIG. 10, in light of FIGS. 1-3, FIG. 10 is a flow diagram showing a method 1000 for generating an authenticated instrument of an oral agreement. Each block of method 1000 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 1000, at least a portion of a digital media recording of a conversation is stored on a server. The digital media recording, or portion thereof, is configured to form (for instance, using oral contract document generation module 132 of FIG. 1) a content portion of an electronic agreement document involving or associated with two or more parties. At block 1010, a uniform resource identifier (URI) or a record associated with and/or referencing the electronic agreement document is communicated to each of the two or more parties. At block 1020, a playback status associated with the content portion of the electronic agreement document is monitored. The playback status is configured to indicate a percentage or amount of the content portion of the electronic agreement document rendered for review by each of the two or more parties. At block 1030, a request is communicated to each of the two or more parties to electronically sign the electronic agreement document in accordance with determining that the playback status indicates that each of the two or more parties have at least substantially reviewed the content portion of the electronic agreement document. At block 1040, the electronically signed electronic agreement document is received, so that the content portion thereof is automatically transcribed and stored in association with the electronic agreement document.

Having described implementations of the present disclosure, an exemplary operating environment in which embodiments of the present invention may be implemented is described below in order to provide a general context for various aspects of the present disclosure. Referring initially to FIG. 11 in particular, an exemplary operating environment for implementing embodiments of the present invention is shown and designated generally as computing device 1100. Computing device 1100 is but one example of a suitable computing environment and is not intended to suggest any limitation as to the scope of use or functionality of the invention. Neither should the computing device 1100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 11, computing device 1100 includes bus 1110 that directly or indirectly couples the following devices: memory 1112, one or more processors 1114, one or more presentation components 1116, input/output (I/O) ports 1118, input/output components 1120, and illustrative power supply 1122. Bus 1110 represents what may be one or more busses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 11 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer-storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors that read data from various entities such as memory 1112 or I/O components 1120. Presentation component(s) 1116 present data indications to a user or other device. Exemplary presentation components include a display device, speaker, printing component, vibrating component, etc.

I/O ports 1118 allow computing device 1100 to be logically coupled to other devices including I/O components 1120, some of which may be built in. Illustrative components include a microphone, joystick, game pad, satellite dish, scanner, printer, wireless device, etc. The I/O components 1120 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1100. The computing device 1100 may be equipped with depth cameras, such as, stereoscopic camera systems, infrared camera systems, RGB camera systems, and combinations of these for gesture detection and recognition. Additionally, the computing device 1100 may be equipped with accelerometers or gyroscopes that enable detection of motion. The output of the accelerometers or gyroscopes may be provided to the display of the computing device 1100 to render immersive augmented reality or virtual reality.

As described above, implementations of the present disclosure provide for generating an authenticated instrument of an oral contract or agreement. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method for generating an authenticated instrument of an oral agreement, the method comprising:

receiving at least a portion of a digital media recording on a server, wherein at least the portion of the digital media recording corresponds to a content portion of an electronic agreement document associated with two or more parties, the content portion comprising at least one defined-essential portion; and for each party in the two or more parties— communicating the electronic agreement document to a computing device associated with the party;

monitoring a respective playback status associated with the content portion of the electronic agreement document, the respective playback status corresponding to one or more pieces of the content portion determined to be reviewed by the party via the associated computing device;

based on a determination that the respective playback status corresponds at least in part to the at least one defined-essential portion of the content portion, communicating, to the associated computing device, a request that the party electronically sign the electronic agreement document, wherein the at least one defined-essential portion comprises tagged portions of the electronic agreement document, the tagged portions containing contract terms flagged by at least one of the two or more parties; and receiving the electronically-signed electronic agreement document from the associated computing device for storage on the server.

2. The method of claim 1, wherein the electronic agreement document is communicated to each of the two or more parties by sending a uniform resource identifier (URI) or a record associated with the electronic agreement document stored on the server to each of the two or more parties.

3. The method of claim 1, wherein review of the content portion of the electronic agreement document is conducted by streaming or downloading the content portion of the electronic agreement document stored on the server to each of the two or more parties.

4. The method of claim 1, wherein review of the content portion of the electronic agreement document is conducted by playing the content portion using a client application configured to monitor the playback status associated therewith.

5. The method of claim 1, wherein the playback status indicates that each of the two or more parties have substantially reviewed the content portion of the electronic agreement document when at least a predetermined threshold of the content portion of the electronic agreement document is reviewed by each of the two or more parties.

6. The method of claim 1, wherein the electronic agreement document is a portable document format (PDF) file.

7. A non-transitory computer storage medium storing computer-useable instructions that, when used by one or more computing devices, cause the one or more computing devices to perform operations comprising:
   storing at least a portion of a digital media recording, the at least a portion of the digital media recording forming a content portion of an electronic agreement document associated with two or more parties, the content portion comprising at least one defined-essential portion; and
   for each party in the two or more parties—
   monitoring a respective playback status associated with the content portion of the electronic agreement document, the respective playback status corresponding to one or more pieces of the content portion of the electronic agreement document determined to be reviewed by the party via an associated computing device;
   based on a determination that the respective playback status corresponds at least in part to the at least one defined-essential portion of the content portion, communicating to the associated computing device, a request to electronically sign the electronic agreement document, wherein the at least one defined-essential portion comprises tagged portions of the electronic agreement document, the tagged portions containing contract terms flagged by at least one of the two or more parties; and
   storing the electronically signed electronic agreement document on the server.

8. The computer storage medium of claim 7, wherein the digital media recording comprises an audio recording of a conversation, the conversation being one of a telephone conversation or a voice-over-IP conversation.

9. The computer storage medium of claim 8, wherein the audio recording is recorded by a mobile computing device on which the conversation occurred.

10. The computer storage medium of claim 7, wherein review of the content portion of the electronic agreement document is conducted by streaming or downloading the content portion of the electronic agreement document stored on the server to each of the two or more parties.

11. The computer storage medium of claim 10, wherein the playback status is based on an amount of the content portion of the electronic agreement document stored on the server streamed to each of the two or more parties.

12. The computer storage medium of claim 7, wherein the playback status indicates that each of the two or more parties have substantially reviewed the content portion of the electronic agreement document when at least a predetermined threshold of the content portion of the electronic agreement document is reviewed by each of the two or more parties.

13. The computer storage medium of claim 7, further comprising transcribing the content portion of the electronically signed electronic agreement document for storage on the server.

14. A computerized system comprising:
   one or more processors; and
   one or more non-transitory computer storage media storing computer-usable instructions that, when used by the one or more processors, cause the one or more processors to:
   receive at least a portion of a digital media recording, the at least a portion of the digital media recording forming a content portion of an electronic agreement document associated with two or more parties, the content portion comprising at least one defined-essential portion; and
   for each party in the two or more parties—
   communicate a uniform resource identifier (URI) or a record associated with the electronic agreement document to a computing device associated with the party to monitor a playback status associated with the content portion, wherein the playback status corresponds to one of one or more pieces of the content portion that is determined to be communicated to the associated computing device via the URI, or one or more pieces of the content portion determined to be reviewed via the associated computing device;
   based upon a determination that the playback status corresponds at least in part to the at least one defined-essential portion of the content portion, communicate to the associated computing device a request to electronically sign the electronic agreement document, wherein the at least one defined-essential portion comprises tagged portions of the electronic agreement document, the tagged portions containing contract terms flagged by at least one of the two or more parties; and
   receive the electronically signed electronic agreement document from the associated computing device for automatic transcription and storage thereof.

15. The system of claim 14, wherein the digital media recording comprises a video recording of an in-person conversation associated with the two or more parties.

16. The system of claim 14, wherein the video recording is recorded by one of the associated computing devices.

17. The system of claim 14, wherein at least one of the associated computing devices is configured to delete or clip out at least a part of the digital media recording.

18. The system of claim 14, wherein the content portion of the electronic agreement document is rendered for review on a client application configured to playback the content portion of the electronic agreement document.

19. The system of claim 14, wherein transcription includes transcribing an audio layer of the content portion of the electronic agreement document into searchable text that is associated with the electronically signed electronic agreement document.

* * * * *